United States Patent [19]

Springer et al.

[11] Patent Number: 4,899,223

[45] Date of Patent: Feb. 6, 1990

[54] ELECTRODE ARRAY FOR AN ELECTROOPTICAL FACSIMILE RECORDER AND METHOD OF CONTROLLING SAID ELECTRODE ARRAY

[75] Inventors: Johann Springer, Aichwald; Wolfgang Heck, Gerlingen, both of Fed. Rep. of Germany

[73] Assignee: Alcatel N.V., Amsterdam, Netherlands

[21] Appl. No.: 272,482

[22] Filed: Nov. 16, 1988

[30] Foreign Application Priority Data

Nov. 19, 1987 [DE]  Fed. Rep. of Germany ....... 3739381

[51] Int. Cl.$^4$ .................... G01D 9/42; G01D 15/14
[52] U.S. Cl. .................................. 358/302; 358/296; 346/107 R; 346/160
[58] Field of Search ............... 358/296, 300, 302, 283, 358/285; 346/108, 107 R, 160, 153.1, 150

[56] References Cited

U.S. PATENT DOCUMENTS 4,607,917  8/1986  Ebner et al. ................. 350/392
4,636,817  1/1987  Masaki ......................... 346/160

FOREIGN PATENT DOCUMENTS 3214584  11/1983  Fed. Rep. of Germany .

Primary Examiner—B. A. Reynolds
Assistant Examiner—Scott A. Rogers
Attorney, Agent, or Firm—Christie, Parker & Hale

[57] ABSTRACT

An electrode array for an electrooptical facsimile recorder and a method of controlling this electrode array are disclosed. A plurality of spot electrodes are inserted between two main electrodes deposited on a lead lanthanum zirconate titanate (PLZT) substrate. In this manner, three partial lines of electrically controllable light gates are formed which provide a line-at-a-time output of the information to be reproduced. The individual light gates are controlled by driver ICs with push-pull output stages. To control the individual partial lines, different voltages must be applied to the main and spot electrodes.

26 Claims, 6 Drawing Sheets

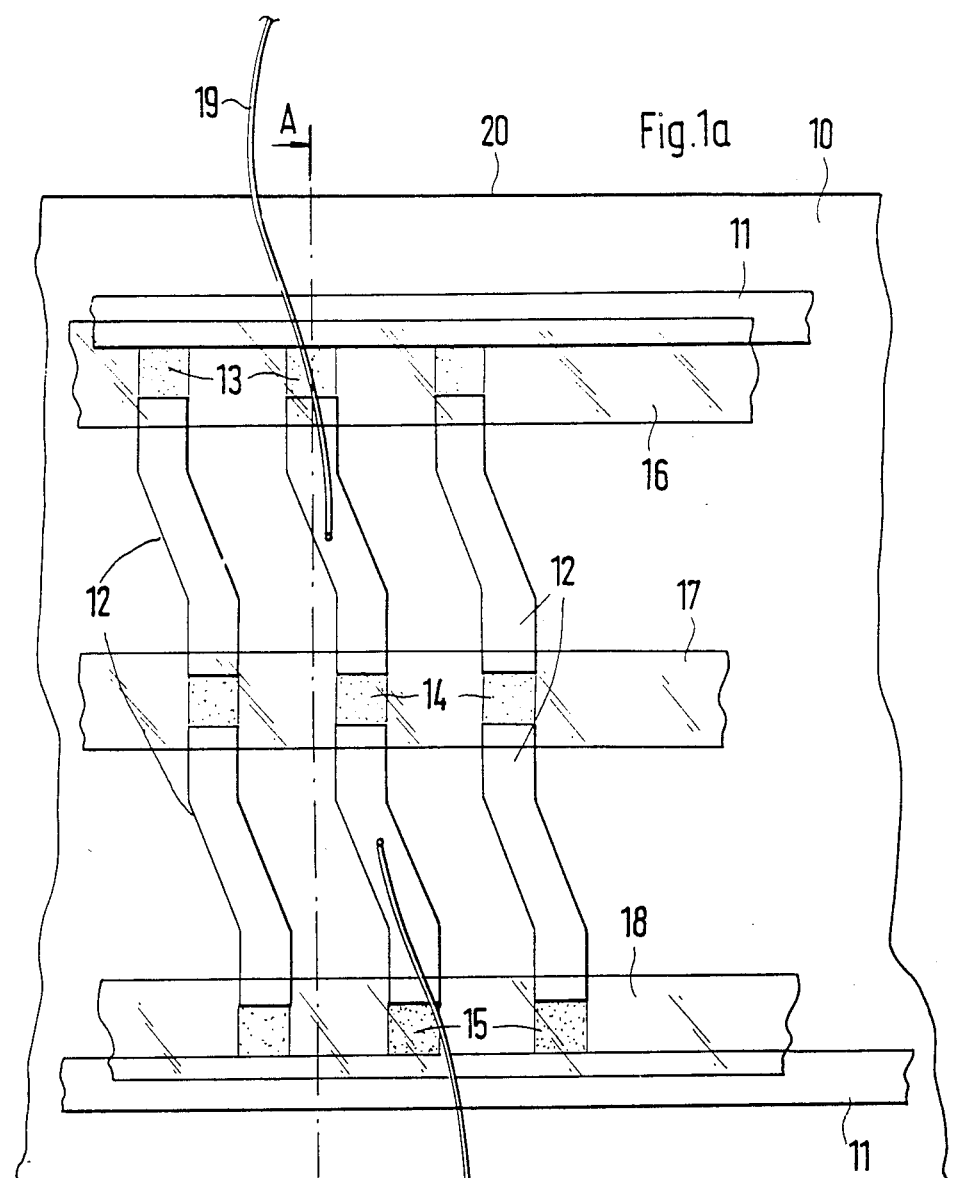
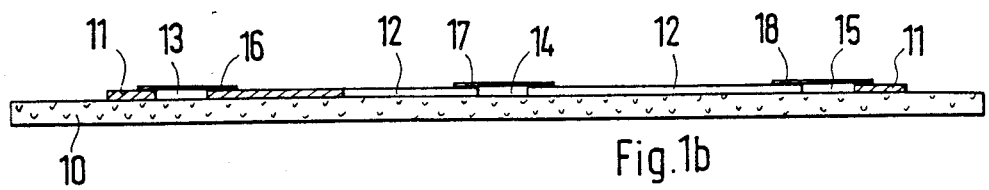

| U1 | U2 | U3 | U4 | S1 | S2 | S3 | S4 | UC1 | UC2 | UC3 | |
|---|---|---|---|---|---|---|---|---|---|---|---|
| U | 1/3U | 2/3U | 1/3U | CLOSED | OPEN | CLOSED | OPEN | 1/3U | 1/3U | 0 | LIGHT GATE 1 CLOSED |
| U | 1/3U | 2/3U | 1/3U | OPEN | CLOSED | CLOSED | OPEN | U | 1/3U | 0 | LIGHT GATE 1 OPEN |
| | | | | | | | | | | | |
| 4/3U | 1/3U | U | 2/3U | CLOSED | OPEN | CLOSED | OPEN | 1/3U | 1/3U | 1/3U | LIGHT GATE 2 CLOSED |
| 4/3U | 1/3U | U | 2/3U | CLOSED | OPEN | OPEN | CLOSED | 1/3U | U | 1/3U | LIGHT GATE 2 OPEN |
| | | | | | | | | | | | |
| 1/3U | U | 1/3U | 2/3U | CLOSED | OPEN | CLOSED | OPEN | 0 | 1/3U | 1/3U | LIGHT GATE 3 CLOSED |
| 1/3U | U | 1/3U | 2/3U | CLOSED | OPEN | OPEN | CLOSED | 0 | 1/3U | U | LIGHT GATE 3 OPEN |

4,899,223

ELECTRODE ARRAY FOR AN ELECTROOPTICAL FACSIMILE RECORDER AND METHOD OF CONTROLLING SAID ELECTRODE ARRAY

TECHNICAL FIELD

The present invention relates to an electrode array for an electrooptical facsimile recorder and to a method of controlling said electrode array.

CLAIM FOR PRIORITY

This application is based on and claims priority from an application first filed in Federal Republic of Germany on 11/19/87 under serial number P37 29 381.2. To the extent such prior application may contain any additional information that might be of any assistance in the use and understanding of the invention claimed herein, it is hereby incorporated by reference.

BACKGROUND ART

Facsimile recorders based on the electrooptical principle, henceforth called "optical printers", have been used for a long time. Published German Patent No. 32 14 584 discloses an optical printer in which the image information is outputted line by line. Electrodes are so deposited on a lead lanthanum zirconate titanate (PLZT) substrate that two lines of electrically controllable light gates are obtained. On each side of an areal main electrode extending in the line direction, a row of likewise areal finger electrodes is disposed. The light gates are formed in those areas of the substrate which are bounded by the ends of the finger electrodes and the long side of the main electrode. The light gates of one line are displaced by one light-gate width relative to those of the other, whereby the two lines are electricalls isolated one from the other. By a skilful arrangement of the electrodes, each line can be represented with the aid of 2N spots if there are N light gates per partial line. In many cases, however, such a resolution is not sufficient and higher resolution is desirable, particularly if the optical printer is to be used for reproducing colored subject copies.

DISCLOSURE OF INVENTION

The object of the present invention consists of two parts, namely 1. to improve the prior-art electrode array so that the optical printer can be used for color reproduction, and
2. to provide a simple method of electrically controlling such a printer.

In accordance with a preferred embodiment, a plurality of spot electrodes are inserted between two main electrodes deposited on a lead lanthanum zirconate titanate (PLZT) substrate. In this manner, three partial lines of electrically controllable light gates may be formed which provide a line-at-a-time output of the information to be reproduced. The individual light gates are preferably controlled by driver ICs with push-pull output stages. To control the individual partial lines, different voltages may be applied to the main and spot electrodes.

The electrode array according to the invention has the advantage that at least three partial lines of light gates can be formed in an optical printer. Another advantage lies in the skilful arrangement of the circuit elements, which results in a simple driving method. A further advantage lies in the manner in which voltages are supplied to the electrodes, which reduces the risk of "crosstalk".

BRIEF DESCRIPTION OF DRAWINGS

An embodiment of the invention will now be explained in greater detail with reference to the accompanying drawings, in which:

FIG. 1a is a top view of part of an electrooptical recorder;

FIG. 1b is a section taken along line A–B of FIG. 1;

FIG. 3 is a chart showing the control voltages required for the light gates of the different partial lines;

BEST MODE FOR CARRYING OUT THE INVENTION

Figures 2, 4:
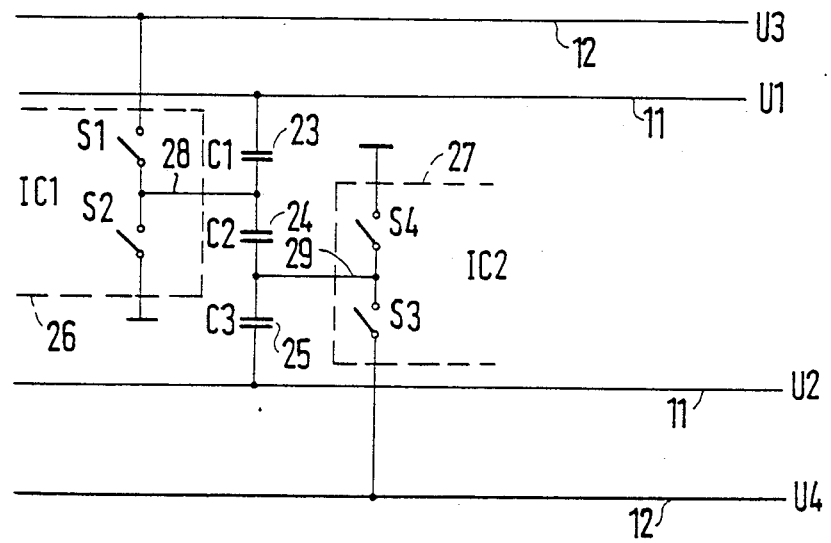
FIG. 2 shows the equivalent electric circuit for a portion consisting of the main electrodes and a pair of spot electrodes.
FIG. 4 is another representation of the chart of FIG. 3.

FIG. 1a shows a part of an electrooptical facsimile recorder. The reference numeral 10 denotes an electrooptical substrate, e.g., a lead lanthanum zirconate titanate (PLZT) ceramic. Two main electrodes 11 are deposited on the substrate in the line direction, and pairs of spot electrodes 12 are interposed between the main electrodes. Between the main electrodes 11 and one end of each of the spot electrodes, areas 13 and 15 are obtained whose light transmission is controllable with the aid of the electrodes. These areas will hereinafter be referred to as "light gates". A light gate 14 is also formed between the adjacent ends of each pair of spot electrodes 12. The light gates 13 belong to a first partial line of the recorder, the light gates 14 to a second partial line, and the light gates 15 to a third partial line. If the recorder is to be used for color reproduction, color filters are provided for the individual partial lines. The color filter for the first partial line is designated 16, that for the second partial line is designated 17, and that for the third partial line is designated 18. The spot electrodes are connected to the control device by bonding wires 19. In FIG. 1a, only two bonding wires are shown so as not to make the representation unclear. The edge of the ceramic substrate is designated 20.

FIG. 1b is a section taken along line A–B of FIG. 1a and illustrates the layered structure of the facsimile recorder. Like elements are designated by like reference characters.

The recorder described works as follows. A given voltage is required to control the light gates. If this voltage is applied between a spot electrode and the main electrode or between two spot electrodes, the light gate will become transparent. Each line to be printed can thus be represented by three partial lines of recording spots. For color reproduction, each partial line is provided with a color filter for, e.g., one primary color. Details of the control of the individual light gates will be explained in the following.

FIG. 2 shows the equivalent electric circuit for a group of light gates formed between the two main electrodes and a pair of intermediate spot electrodes and between the pair of spot electrodes. Like in FIG. 1, the two main electrodes, to which voltages U1 and U2 are applied, are designated 11, and a pair of spot electrodes, to which the voltages U3 and U4 are applied, is designated 12. 23 denotes a capacitance C1 formed by a spot electrode and a main electrode. It represents the electric equivalent of a light gate 13. 24 denotes a capacitance C2 which is formed by two spot electrodes and represents the electric equivalent of a light gate 14.

Reference numeral 25 denotes a capacitance C3 which is formed by a spot electrode and a main electrode and represents the electric equivalent of a light gate 15. 26 denotes an output stage of a driver IC IC1, illustrated by switches S1 and S2, and 27 an output stage of a driver IC IC2, illustrated by switches S3 and S4. A wire 28 connects one spot electrode of the spot-electrode pair with an output stage of IC1, and a wire 29 connects the second spot electrode with an output stage of IC2. The wires 28 and 29 correspond to the bonding wires 19 of FIG. 1a. The bonding wires 19 are electrically isolated from the main electrodes 11.

In the chart of FIG. 3, the positions of the switches S1 to S4, which are the electric equivalents of the driver ICs 26 and 27, and the voltages U1 to U4 required to control the individual light gates are given. As can be seen in the left-hand column, only the driver IC IC1 (represented by switches S1 and S2) is needed to control the light gates 13 in the first partial line. The necessary control voltages are given in the chart. The light gates 14 and 15 of the second and third partial lines are controlled by the driver IC IC2 (represented by the switches S3 and S4).

Figure 5:
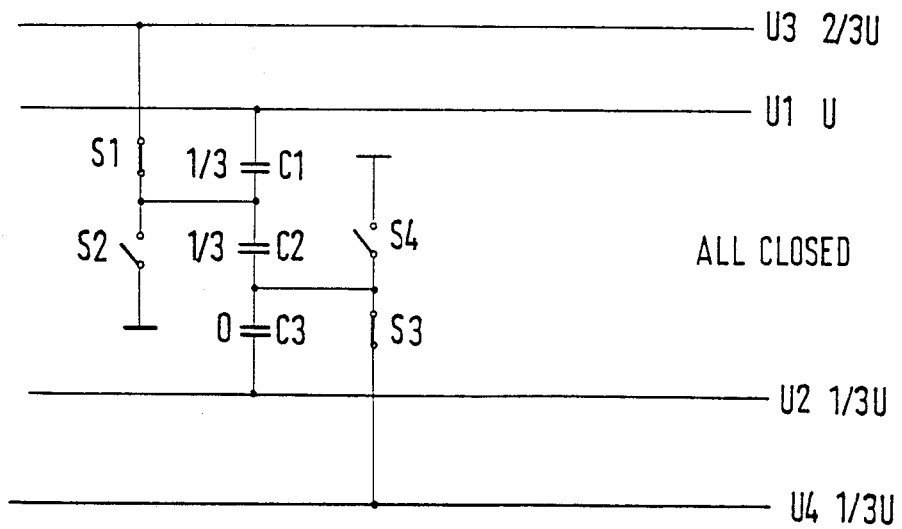
FIG. 5 shows control voltages and switch positions for the state "light gates of the three partial lines closed"
Figure 6:
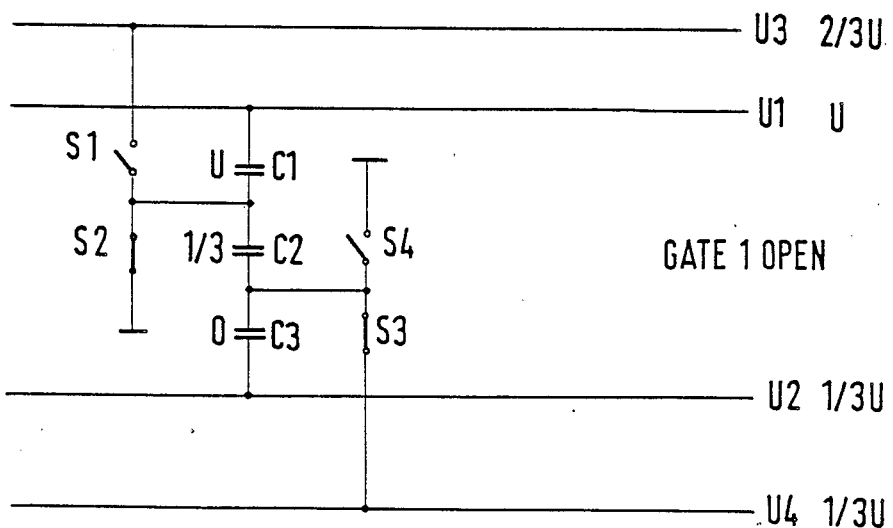
FIG. 6 shows control voltages and switch positions for the state "light gates of the first partial line open"

An detailed representation of the output states of the two driver ICs 26 and 27 and of the voltages U1 to U4 to be applied to the electrodes is given in FIG. 4. The top row contains the reference characters of the voltages U1 to U4, followed by the reference characters of the switches S1 to S4 and the voltages UC1, UC2 and UC3, which are applied to the three light gates (represented by capacitances C1 to C3). To control the light gates 13 in the first partial line, the voltage U1 has the value U, the voltage U2 the value U/3, the voltage U3 the value 2U/3, and the voltage U4 the value U/3. If the switches S1 and S3 are closed and the switches S2 and S4 are open, the voltage U/3 appears across the capacitance C1 (reference numeral 23), the voltage U/3 across the capacitance C2 (reference numeral 24), and the voltage 0 across the capacitance C3 (reference numeral 25). Since the light gates do not become transparent until the voltage applied to them exceeds 2U/3, all light gates are closed in this state. FIG. 5 shows the equivalent circuit with the switch positions for this state. FIG. 6 shows the state in which the light gate 13 in the first partial line is open. The switches S2 and S3 are closed, and the switches S1 and S4 are open. The voltage across the individual capacitances C1 to C3 are U, U/3, and 0, respectively. The voltages applied to the individual electrodes are the same as in the case where light gate 1 is closed. In the embodiment, a voltage U of 180 V was used. However, this voltage is strongly dependent on the geometry of the arrangement, so that U may lie in the range between 100 V and 240 V.

Figure 7:
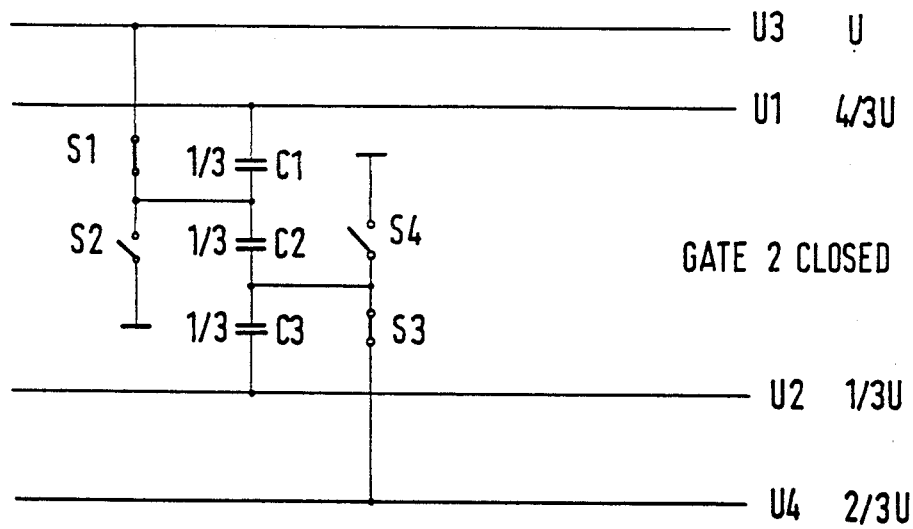
FIG. 7 shows control voltages and switch positions for the state "light gates of the second partial line closed"

To control the light gate 2, the voltages U1 to U4 must assume other values. These values are: U1=4/3U, U2=⅓U, U3=U, and U4=⅔U. With switches S1, S3 closed and switches S2, S4 open, gate 14 is opaque, since the voltage U/3 appears across the capacitance C2. This state is shown in FIG. 7.

Figure 8:
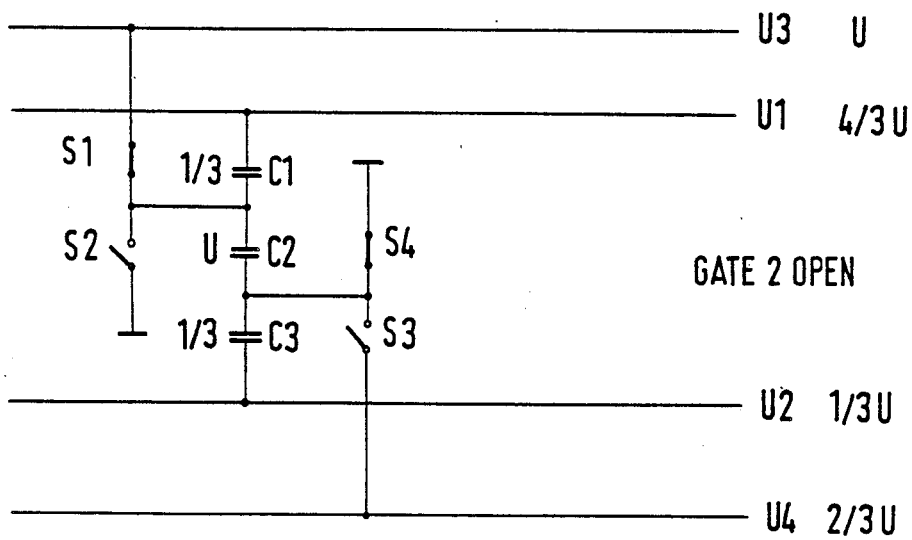
FIG. 8 shows control voltages and switch positions for the state "light gates of the second partial line open"

If the switches S2 and S3 are open and the switches S1 and S4 are closed, the voltage U appears across the capacitance C2, i.e., light gate 14 is transparent. The voltage U/3 appears across both capacitances C1 and C3. This state is shown in FIG. 8.

Figure 9:
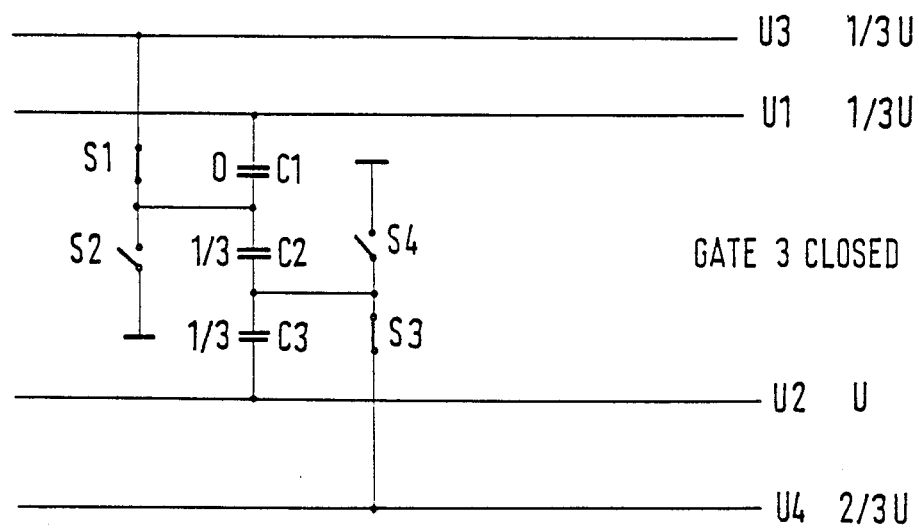
FIG. 9 shows control voltages and switch positions for the state "light gates of the third partial line closed"

To control the light gates 15 in the third partial line, the voltages U1 to U4 assume the following values: U1=U/3, U2=U, U3=⅓U, and U4=⅔U. With switches S1 and S3 closed and switches S2 and S4 open, the voltage 0 appears across the capacitance C1, the voltage U/3 across the capacitance C2, and the voltage U/3 across the capacitance C3. All light gates are thus opaque. This state is shown in FIG. 9.

Figure 10:
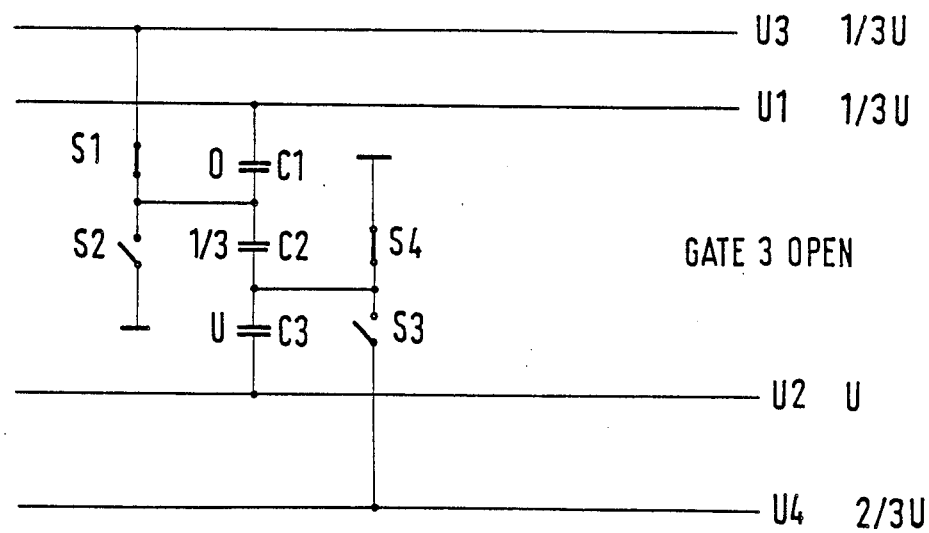
FIG. 10 shows control voltages and switch positions for the state "light gates of the third partial line open".

If the switches S1 and S4 are closed, but the switches S2 and S3 are open, light gate 15 becomes transparent, because the voltage across the capacitance C3 assumes the value U. The voltage across the capacitance C1 is 0, and that across the capacitance C2 is U/3. This state is shown in FIG. 10.

The driver stages 26 and 27 (IC1 and IC2) are types in which one of the two switches is open while the other is closed. The individual switches, in the embodiment S1 and S2 or S3 and S4, are thus operable not individually, but only as a pair. The operation of the electrooptical recorder is then as follows.

With the aid of a multiplexing circuit, the voltages U1 to U4 are brought to the values required to control the first partial line. Then, the individual light gates of the first partial line are energized in accordance with the information to be reproduced. After the first partial line has been printed, the voltages are switched to the values required to control the second partial line. Then, the information of the second partial line is delivered. At the end of the delivery of the second line, the voltage is switched to the values required to control the light gates of the third partial line. After delivery of the third partial line, the next line to be reproduced is delivered beginning with the first partial line.

We claim:

1. Electrode array deposited on a common surface of an electrooptical substrate so as to form at least three partial lines of electrically, each having at least three independently, controllable light gates, said electrode array comprising two main electrodes extending parallel to one another in a line direction parallel to said partial lines, and a plurality of spot electrodes interposed between said two main electrodes in a second direction generally perpendicular to the line direction and electrically isolated from each other and from the main electrodes, wherein each of the light gates is defined by opposing portions of two adjacent said electrodes.

2. Electrode array deposited on an electrooptical substrate so as to form at least three partial lines of electrically controllable light gates, said array comprising two main electrodes extending parallel to one another in a line direction parallel to said partial lines, and a plurality of spot electrodes interposed in sequences of at least two of said spot electrodes between the main electrodes in a second direction generally perpendicular to the line direction, wherein a first linear array of light gates is formed between respective first spot electrodes in each of said sequences and a first one of said main electrodes.

3. An electrode array as claimed in claim 2, wherein a second linear array of light gates if formed between adjacent first and second spot electrodes in each of said sequences.

4. An electrode array as claimed in claim 3, wherein a third linear array of light gates is formed between the second one of the spot electrodes in each of said sequences and the second of said main electrodes to thereby provide a total of three partial lines of light gates.

5. An electrode array as claimed in claim 2, wherein the number of spot-electrodes is equal to twice the number of light gates provide for one partial line.

6. Electrode array deposited on n electrooptical substrate so as to form at least three staggered partial lines of electrically controllable light gates, said array comprising two main electrodes extending parallel to one another in a line direction parallel to said staggered partial lines, and a plurality of spot electrodes interposed in sequences of at least two of said spot electrodes between the main electrodes in a second direction generally perpendicular to the line direction, wherein the spot electrodes are stagger shaped so that their opposite ends are displaced by the width of one light gate in relation to one another.

7. Electrode array deposited on an electrooptical substrate so as to form at least three partial lines of electrically controllable light gates, said array comprising two main electrodes extending parallel to one another in a line direction parallel to said partial lines, and a plurality of spot electrodes interposed in sequences of at least two of said spot electrodes between the main electrodes in a second direction generally perpendicular to the line direction, wherein the spot electrodes are connected to a control device by bonding wires.

8. An electrode array as claimed in claim 7, wherein the bonding wires are electrically isolated from the main electrodes.

9. Electrode array deposited on an electrooptical substrate so as to form at least three partial lines of electrically controllable light gates, said array comprising two main electrodes extending parallel to one another in a line direction parallel to said partial lines, and a plurality of spot electrodes interposed in sequences of at least two of said spot electrodes between the main electrodes in a second direction generally perpendicular to the line direction, wherein said electrooptical substrate comprises lead lanthanum zirconate titanate (PLZT) ceramic.

10. Electrode array deposited on an electrooptical substrate so as to form at least three partial lines of electrically controllable light gates, said array comprising two main electrodes extending parallel to one another in a line direction parallel to said partial lines, and a plurality of spot electrodes interposed in sequences of at least two of said spot electrodes between the main electrodes in a second direction generally perpendicular to the line direction, wherein said electrooptical substrate is constructed by thin-film techniques.

11. An electrode array as claimed in claim 1, characterized by its use in a high-resolution monochrome facsimile recorder.

12. An electrode array as claimed in claim 4, characterized by its use in a color facsimile recorder.

13. An electrode array as claimed in claim 12, wherein the individual partial lines are underlaid with a color filter, with each partial line assigned one primary color.

14. An electrode array as claimed in claim 13, wherein the color filters are printed onto the partial lines.

15. An electrode array as claimed in claim 13, wherein the color filters are formed by films.

16. Apparatus comprising the electrode array as claimed in claim 4, further comprising means for electrically controlling the light gates by energizing them line by line.

17. Apparatus as claimed in claim 16, further comprising a first group of driver stages for energizing only the light gates of the first partial line.

18. Apparatus as claimed in claim 17, further comprising a second group of driver stages separate and distinct from said first group of driver stages for energizing the light gates of both the second and third partial lines.

19. Apparatus as claimed in claim 18, wherein the number of driver stages per group is equal to the number of light gates per partial line.

20. Apparatus as claimed in claim 19, wherein the output stages of the driver stages, which output stages act as switches, never are both simultaneously open or both simultaneously closed.

21. Apparatus as claimed in claim 16, wherein the voltages applied to the main electrodes and to each linear array of spot electrodes are not all equal.

22. Apparatus as claimed in claim 21, wherein each of said voltages assumes different values at different times.

23. Apparatus as claimed in claim 22, wherein the value of said each voltage depends on the partial line then being energized.

24. Apparatus as claimed in claim 23, wherein a selected one of the light gates becomes transparent if a voltage of magnitude U, which depends on the material and the geometry of the electrode array, is applied across the selected light gate.

25. Apparatus as claimed in claim 24, wherein a selected one of the light gates becomes opaque if a voltage less than U/3 is applied across the selected light gate.

26. Apparatus as claimed in claim 25, wherein the voltages applied to the main and spot electrodes can selectively assume the values U/3, 2U/3, U, and 4U/3.

* * * * *

UNITED STATES PATENT AND TRADEMARK OFFICE
CERTIFICATE OF CORRECTION

PATENT NO. : 4,899,223
DATED : February 6, 1990
INVENTOR(S) : Johann Springer; Wolfgang Heck It is certified that error appears in the above-identified patent and that said Letters Patent is hereby corrected as shown below:

Column 1, line 36, change "electricalls" to
    -- electrically --.
Column 1, line 37, change "skilful" to -- skillful --.
Column 1, line 66, change "skilful'" to -- skillful --.

Column 3, line 42, change "An" to -- A --.

Column 5, line 9, after "gates" change "if" to -- is --.
Column 5, line 19, change "provide" to -- provided --.
Column 5, line 20, before "electrooptical" change
    "n" to -- an --.

Signed and Sealed this

Sixteenth Day of March, 1993

*Attest:*

STEPHEN G. KUNIN

*Attesting Officer*   Acting Commissioner of Patents and Trademarks